Oct. 1, 1940.  E. R. SABEL ET AL  2,216,629
SLITTING AND CUTOFF MECHANISM FOR SHEET MATERIAL
Filed Aug. 24, 1939   10 Sheets-Sheet 1

INVENTORS
Edward R. Sabel
Frank T. Galbrecht
BY Harold E. Stonebraker
their ATTORNEY.

Oct. 1, 1940.  E. R. SABEL ET AL  2,216,629
SLITTING AND CUTOFF MECHANISM FOR SHEET MATERIAL
Filed Aug. 24, 1939   10 Sheets-Sheet 7

Fig. 7

INVENTORS
Edward R. Sabel
Frank J. Galbrecht
BY Harold E. Stonebraker,
their ATTORNEY.

Oct. 1, 1940. E. R. SABEL ET AL 2,216,629
SLITTING AND CUTOFF MECHANISM FOR SHEET MATERIAL
Filed Aug. 24, 1939 10 Sheets-Sheet 8

Fig. 8

INVENTORS
Edward R. Sabel
Frank J. Galbrecht
BY Harold E. Stonebraker
their ATTORNEY.

Oct. 1, 1940.   E. R. SABEL ET AL   2,216,629
SLITTING AND CUTOFF MECHANISM FOR SHEET MATERIAL
Filed Aug. 24, 1939   10 Sheets-Sheet 9

INVENTORS
Edward R. Sabel
Frank I. Galbrecht
BY Harold E. Stonebraker
their ATTORNEY.

Oct. 1, 1940.  E. R. SABEL ET AL  2,216,629
SLITTING AND CUTOFF MECHANISM FOR SHEET MATERIAL
Filed Aug. 24, 1939  10 Sheets-Sheet 10

INVENTORS
Edward R. Sabel
Frank I. Galbrecht
BY Harold E. Stonebraker
Their ATTORNEY.

Patented Oct. 1, 1940

2,216,629

UNITED STATES PATENT OFFICE

2,216,629

SLITTING AND CUTOFF MECHANISM FOR SHEET MATERIAL

Edward R. Sabel and Frank I. Galbrecht, Rochester, N. Y., assignors to The Haloid Company, Rochester, N. Y., a corporation of New York Application August 24, 1939, Serial No. 291,740

12 Claims. (Cl. 164—43)

This invention relates to a slitting and cutoff mechanism for sheet material, and relates more particularly to a machine for cutting a sheet of paper endwise into a series of strips and thereafter cutting the strips transversely to produce a multiplicity of pieces of predetermined dimensions from a single large sheet.

In some states, copies of automobile licenses are made by photocopying a multiplicity of such forms, prearranged in juxtaposition to each other, on a single sheet of sensitized paper. It is then necessary to cut the sheet into separate pieces, each of which bears a copy of one license, and a purpose of the invention is to provide a practical, simple, and automatic mechanism into which such a sheet can be readily inserted and positioned, and which quickly cuts the sheet along predetermined lines both endwise and crosswise to produce the required number of individual pieces.

More particularly the invention is intended to afford a machine embodying slitting knives that cut a sheet endwise into a series of strips of predetermined width and which thereafter cuts said strips transversely at successive points as such points of the strips reach the cutoff mechanism.

Still an additional purpose is to afford feeding mechanism that moves the slitted sheet for a predetermined distance and then holds it against movement, during which idle cycle of the feeding mechanism the cutoff mechanism is automatically operated.

A further object of the invention is to afford a practical and efficient automatically controlled cutoff mechanism that is operated in timed relation to a feeding mechanism whereby a sheet can be severed transversely after it has been fed a predetermined distance which is adjustably determinable.

Another purpose is to provide means that will accurately control a feeding mechanism and a cutoff mechanism so as to insure accurate and uniform movement of the feeding mechanism and to prevent any jar of the machine resulting from movement of the cutoff knife or feeding mechanism.

Still a further purpose of the invention is to afford control means for readily and quickly disengaging or throwing out of operation the cutoff mechanism and the feeding mechanism, so as to permit inserting and properly positioning a sheet in the machine.

To these and other ends, the invention consists in the construction and arrangement of parts that will appear clearly from the following description when read in conjunction with the accompanying drawings, the novel features being pointed out in the claims following the specification.

Referring more particularly to the drawings in which like reference characters refer to the same parts throughout the several views, the invention is herein illustrated as embodied in a machine for cutting a sheet of paper containing copies of a multiplicity of forms into small rectangular pieces of predetermined size. The sheet of paper is introduced first to a slitting mechanism, preferably in the form of two interengaging series of continuously rotating knives that cut the sheet endwise as it travels therebetween, after which the sheet passes between a pair of intermittently operating feeding rolls which during each feeding operation move the sheet lengthwise a distance corresponding to the length of one of the forms or individual pieces to be cut, and thereafter, during the idle cycle of the feeding rolls and while the sheet is stationary, the cutoff mechanism is automatically operated to sever the sheet, or the previously slitted portions, transversely.

The cutoff mechanism is operated in timed relation to the feeding rolls so that an accurately predetermined length of paper is always severed, and the operation of the cutoff mechanism and feeding rolls may be discontinued and the feeding rolls separated by a convenient control means to permit inserting and properly positioning a sheet in the machine. With this general summary of the structure, the following description will deal with the work table, the endwise slitting knives, the feeding rolls, and the cutoff mechanism in the order mentioned.

Figure 1:
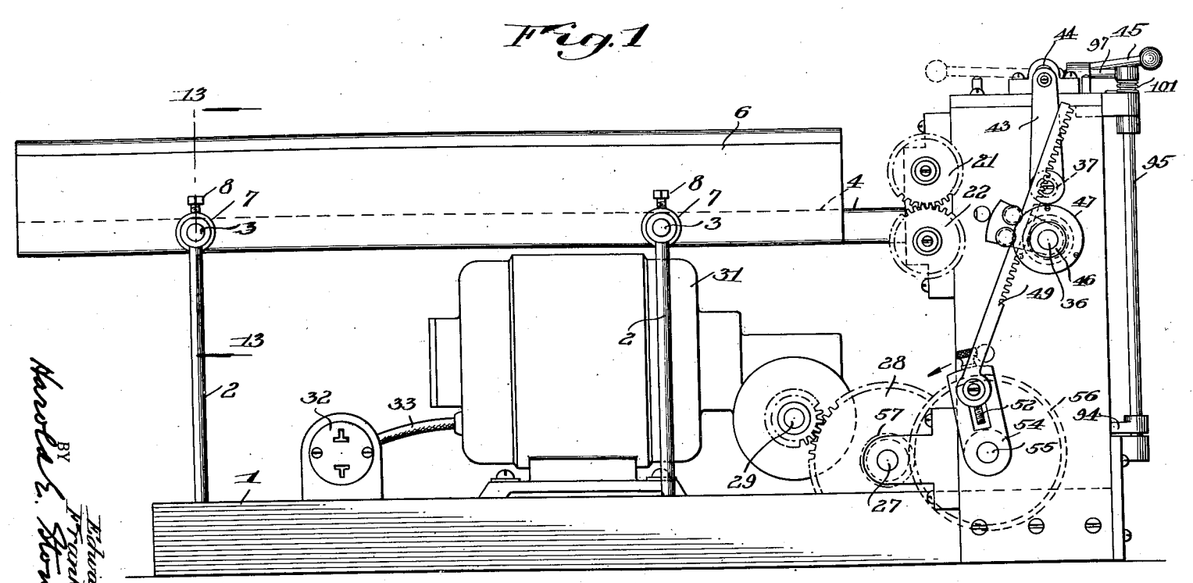
Fig. 1 is a view in side elevation of a machine built in accordance with a preferred embodiment of the invention.
Figure 13:
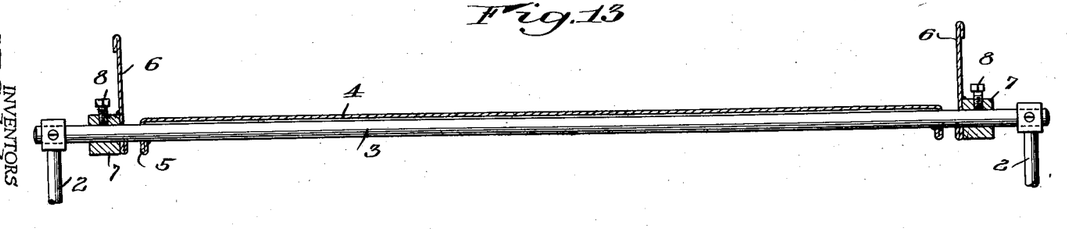
Fig. 13 is a transverse vertical sectional view on the line 13—13 of Fig. 1, showing the feed table and adjustable sides therefor.

Referring to Figs. 1 and 13, 1 designates the base of the machine, 2 are suitable uprights attached thereto, and carried by the uprights 2 are the horizontal supporting rods 3 upon which is mounted the table 4 having depending flanges 5 at its edges through which said supporting rods 3 extend. The work or paper sheet is inserted into the machine while resting on the table 4, and 6 designate side walls or guides for engaging the side edges of the paper sheet and directing it properly into the machine. To accommodate sheets of varying widths, the side walls 6 are adjustable laterally, and to this end carry collars 7 which are adjustable on the horizontal rods 3 and held in adjustable position by the set screws 8.

Figure 4:
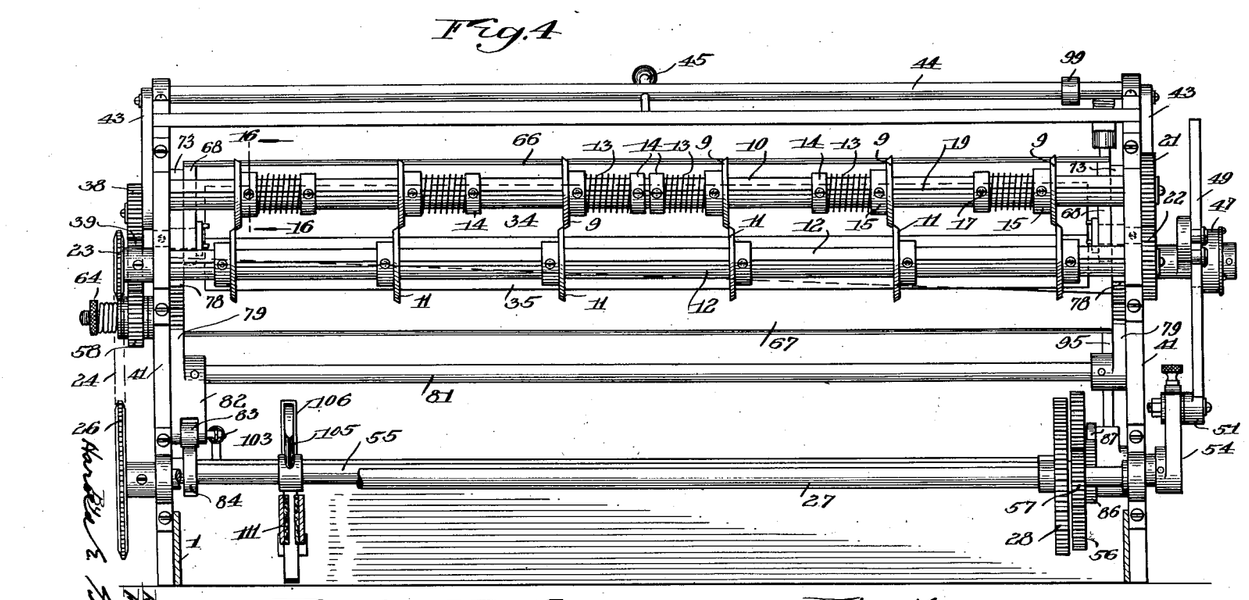
Fig. 4 is a vertical sectional view, with parts broken away, looking toward the slitting knives or feeding end of the machine.

The paper sheet while supported on and pushed along the table 4 is first subjected to the operation of slitting mechanism which cuts the sheet endwise into strips of predetermined width, and this is preferably accomplished by an upper series of rotating slitting knifes 9, see Fig. 4, keyed on the rotating spindle 10, and a lower series of rotating slitting knives 11 fixed on the rotating spindle 12. The knives 11 are adjustably mounted on the spindle 12, the knives on one side of the center of the spindle facing oppositely to those on the other side of the center, while the knives 9 on spindle 10 are yieldably held against the lower knives 11 by means of springs 13 extending between the collars 14 fixed on the spindle 10 and the collars 15 which carry the knives 9. Each collar 15 is provided with a threaded pin 17 having a projection 18 engaging a slot 19 in the spindle 10, thereby preventing turning of its knife 9 relatively to the spindle 10, while permitting endwise movement of the knife 9 on the spindle so that it is constantly held against the cooperating knife 11 by the actuating spring 13. The knives 9 on spindle 10 are also oppositely disposed on the two sides of the center of the spindle for cooperation with the knives 11, and to insure equalized movement of the paper sheet through the machine by exerting a uniform tension toward both edges.

Figure 5:
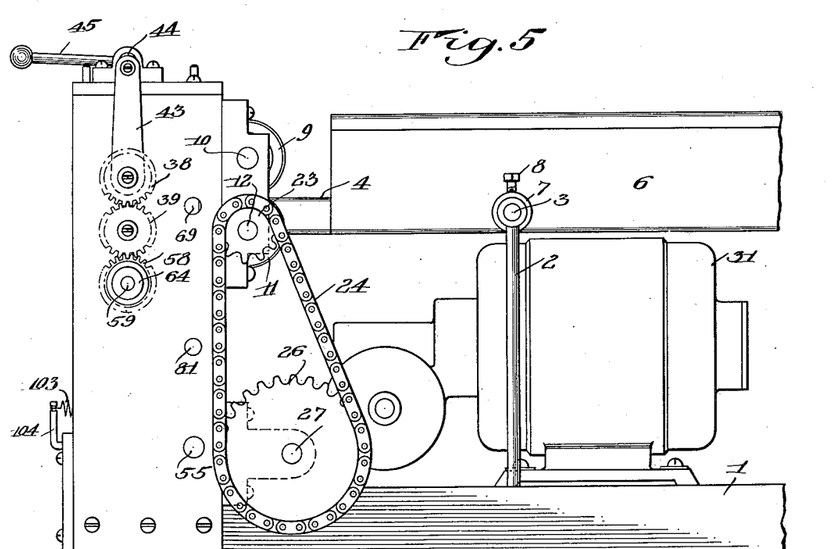
Fig. 5 is a side elevation, partially broken away, looking toward the side opposite from that illustrated in Fig. 1.

The spindles 10 and 12 carry at their ends the interengaging pinions 21 and 22, see Fig. 4, and spindle 12 carries at its opposite end a sprocket wheel 23 engaged by a chain 24, see Fig. 5, which is driven by a sprocket wheel 26, the latter being fixed on the drive shaft 27, see Figs. 4 and 5. Drive shaft 27 carries a gear 28 that is engaged and driven by a pinion mounted on a shaft 29, see Fig. 1, that also carries a suitable worm gear driven by a worm on the motor shaft of the electric motor 31. 32 is a socket connected with the motor 31 by conductor 33 so that the machine may be placed in position anywhere and readily connected with a source of electric power.

After the sheet is slit endwise by the knives 9 and 11 just described, it passes to feeding rolls which when in operation engage and move the sheet intermittently to enable predetermined lengths to be severed by the cutoff mechanism. The feeding rolls are designated at 34 and 35 respectively, see Figs. 6, 7 and 9, and the lower feeding roll 35 is mounted on a spindle 36 that is intermittently rotated in a manner to be described presently. The feeding roll 34 is mounted on a spindle 37 which carries a pinion 38 engaged and driven by a pinion 39 on the spindle 36. The lower spindle 36 is suitably journalled in the vertical standards 41 of the frame of the machine, and said standards are slotted vertically at 42 to permit bodily upward movement of the spindle 37 carrying the upper feeding roll 34, in order to permit separation of the feeding rolls when they are not operating and while a paper sheet is inserted in the machine. To accomplish such separation of the feeding rolls, the upper spindle 37 is supported by links 43 which are eccentrically connected to the oscillatory shaft 44 constituting part of the control means. The shaft 44 carries a handle 45 by which it may be conveniently moved from the position shown in full lines in Figs. 1 and 5 to the position shown in Fig. 9 and in dotted lines in Fig. 1 in order to separate the feeding rolls.

Figures 11, 12:
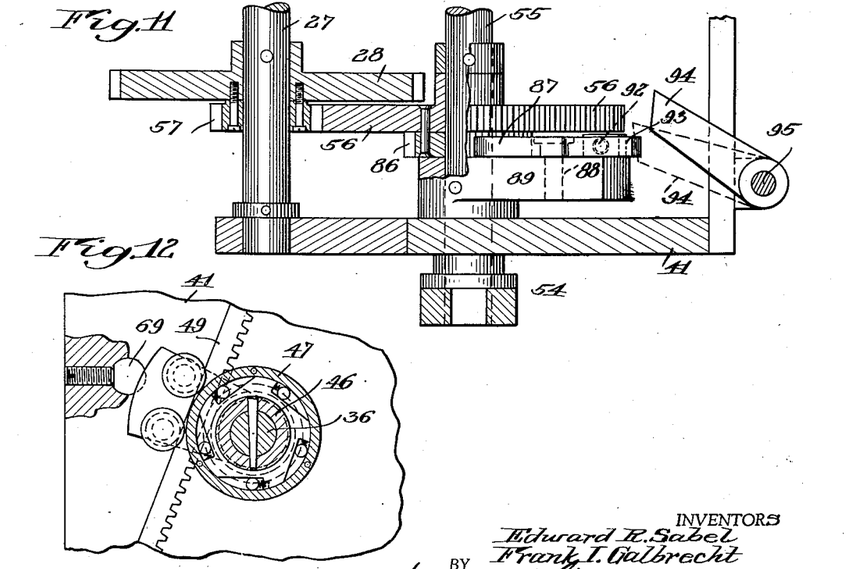
Fig. 11 is a horizontal sectional view of the parts illustrated in Fig. 10.
Fig. 12 is a detail sectional view on the line 12—12 of Fig. 6.

Referring again to Fig. 6, the feeding rolls are operated intermittently by mechanism connected to the spindle 36, and to this end, the spindle 36 carries fixed thereto the clutch element 46, see Figs. 6 and 12, while 47 designates a cooperating clutch element that is fixedly connected to pinion 48 loosely mounted on the spindle 36 and engaged by the reciprocatory rack 49, see Figs. 6 and 12. The rack 49 has its lower end connected to a pin 51 which is adjustably connected by means of adjusting bolt 52 and nut 53 to a crank 54, the latter being fixed upon a shaft 55, see Figs. 1, 6 and 11. The shaft 55, when engaged with the drive by the control means to be described later, is operated by gear 56, loosely mounted on shaft 55, and pinion 57 on the aforementioned drive shaft 27. In this fashion, the spindle 55 is driven during operation of the cutoff mechanism to be described, the feeding rolls being moved during each upstroke of the rack 49, and being idle and retaining the paper sheet against movement during the downstroke of the rack 49 to permit operation of the cutoff mechanism during such idle cycle, as will be described presently.

Figure 6:
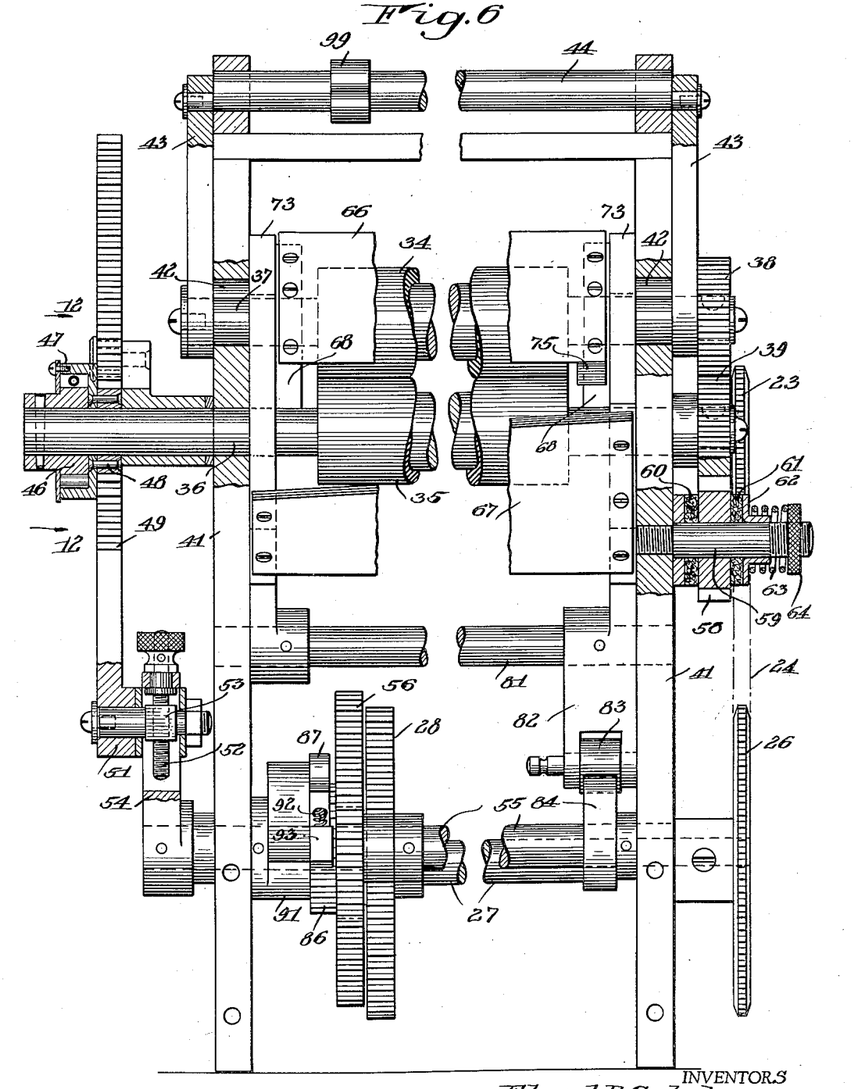
Fig. 6 is an enlarged end elevation similar to Fig. 3, broken away centrally, and with parts appearing in section as indicated.

The length of paper fed at each operation of the feeding rolls can be accurately determined by adjusting the position of the rack 49 and pin 51 relatively to the crank 54, see Fig. 6. It is important in a mechanism of this character that the extent of movement of the paper sheet at each operation of the feeding rolls be the same, and that there be no overrunning of the feeding rolls and paper sheet as the rack 49 starts its downward movement. In order to accomplish this, the feeding rolls are provided with a retarding or brake mechanism that requires them to be positively driven and stops them instantly during the idle cycle, or when the drive is disconnected. This is shown in Fig. 6, and comprises a pinion 58 engaging the aforementioned pinion 39 and rotatably mounted on an arbor 59. 60 and 61 designate friction disks supported on the arbor 59 engaging opposite sides of the pinion 58 and held thereagainst by adjustable pressure resulting from a follower 62, spring 63, and the adjusting nut 64 that is threaded on the arbor 59 and holds the spring 63 on the arbor against the follower 62, maintaining the pinion 58 against movement with sufficient pressure to hold pinion 39 and the feeding rolls against accidental displacement. By this mechanism, the brake tension or resistance to movement of the feeding rolls can be adjusted to a nicety, and overrunning of the feeding rolls or excessive movement of the paper sheet is effectively prevented.

Figure 3:
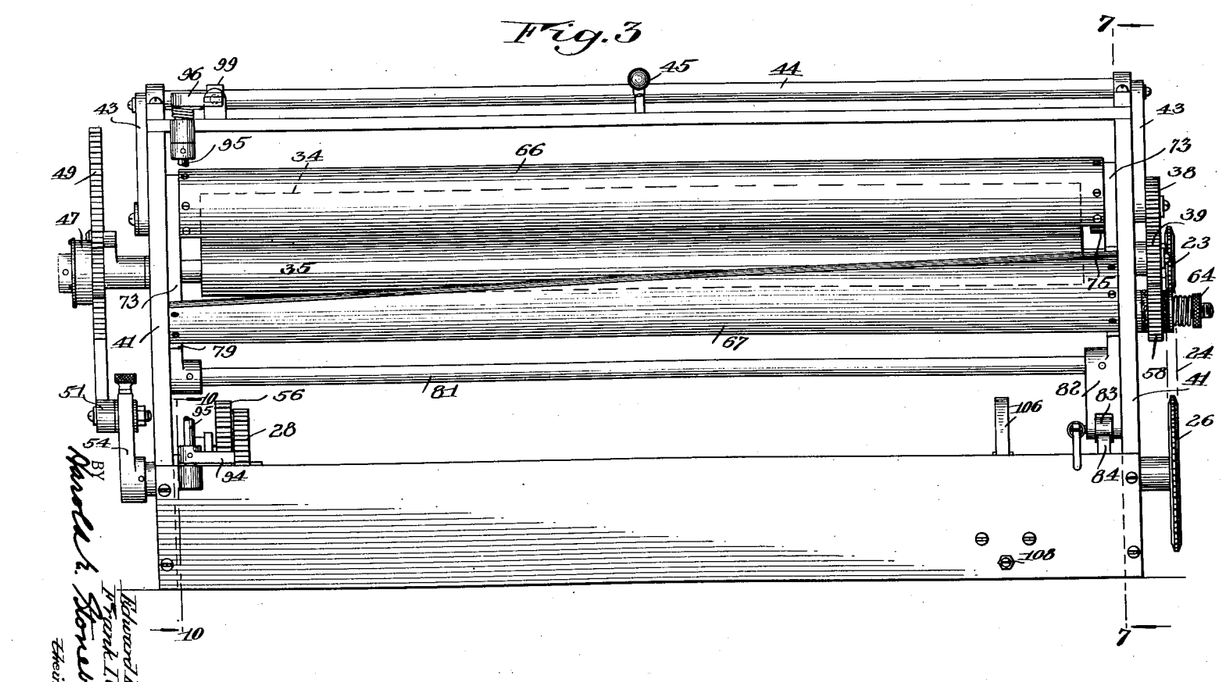
Fig. 3 is a view in end elevation looking toward the cutoff mechanism or discharge end of the machine.
Figure 7:
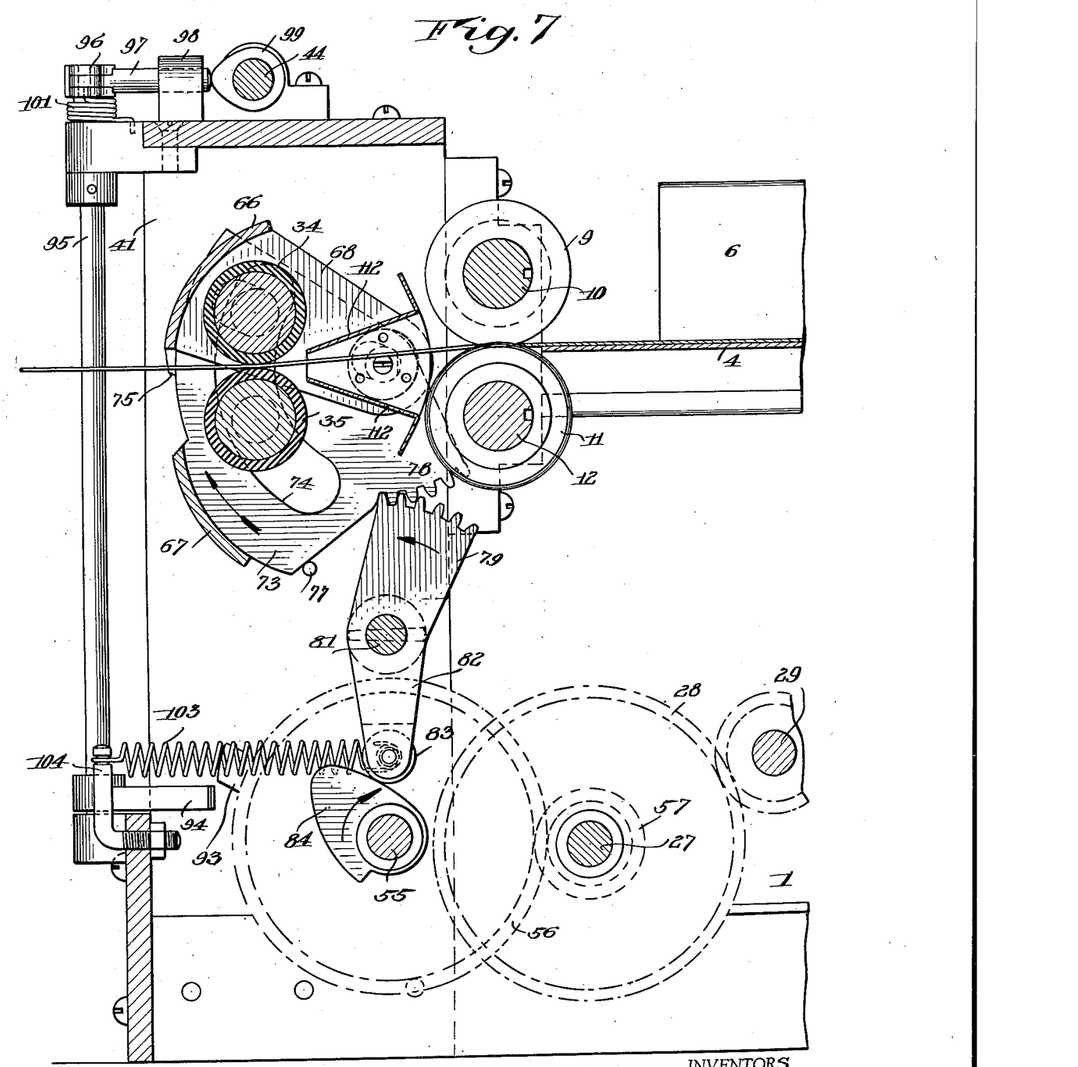
Fig. 7 is a vertical sectional view on the line 7—7 of Fig. 3, showing the cutoff mechanism in initial position, prior to making a transverse cut through the previously slitted sheet.
Figures 9, 19, 20:
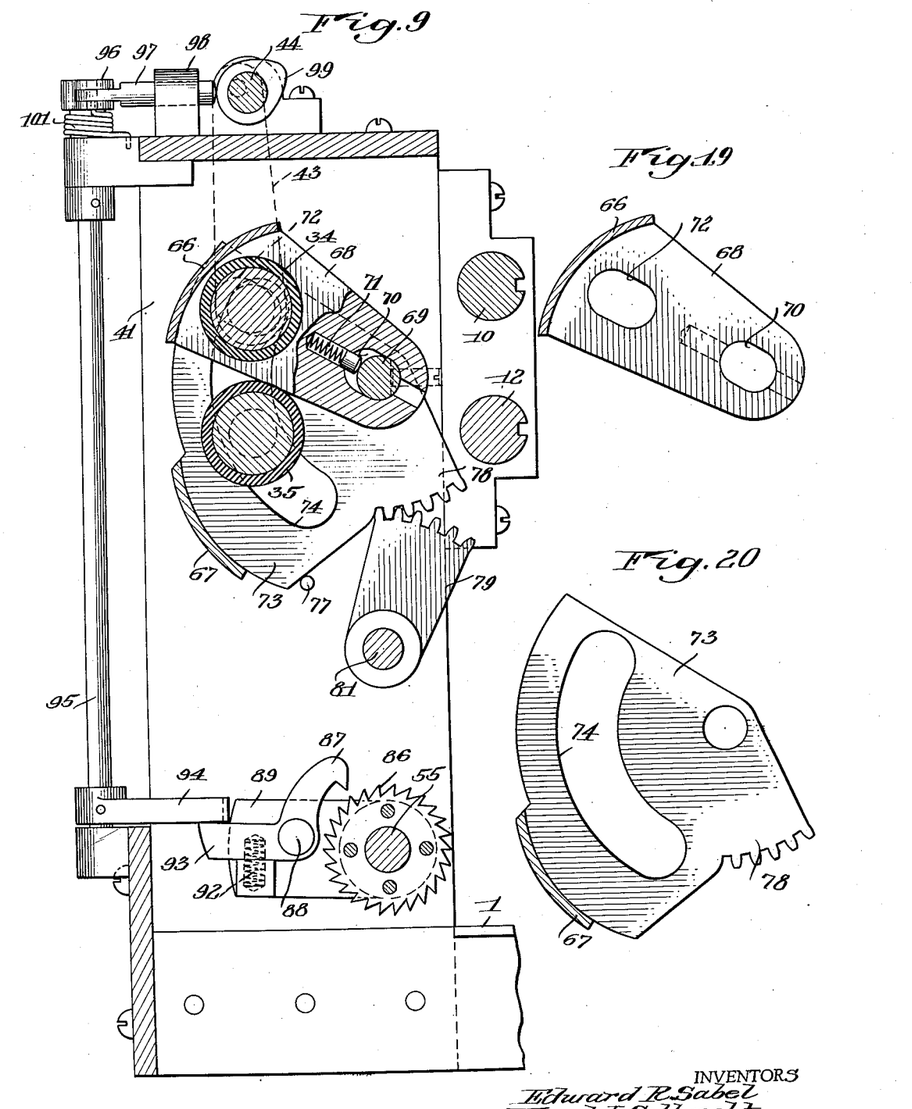
Fig. 9 is a vertical sectional view on the line 9—9 of Fig. 2, showing the position of the parts when the cutoff mechanism has been disengaged and the feeding rolls separated.
Fig. 19 is a sectional view through the relatively stationary knife of the cutoff mechanism.
Fig. 20 is a sectional view through the swinging knife of the cutoff mechanism.

After the paper has been cut endwise into relatively narrow strips and moved a predetermined distance by the feeding rolls, it is severed transversely by cutoff mechanism including an upper knife 66, see Figs. 3, 7 and 9, and a lower knife 67 that is adapted to swing upwardly in an arcuate path to engage the upper knife 66 and effect a transverse shearing cut of the sheet. The upper knife 66 is carried by plates 68 which are supported upon the bar 69, see Fig. 9, the plates 68 being slotted at 70 to permit a slight endwise movement with relation to the bar 69 and a corresponding bodily lateral movement of the knife 66 as the knife 67 is moved upwardly into engagement therewith, this movement of the plates 68 being resisted by the springs 71 which actuate the upper knife 66 to its outermost position.

The plates 68 are supported at their front ends on the spindle 37 which carries the upper feeding roll, and to this end are slotted at 72 to permit the slight bodily movement of the knife 66 already mentioned. It will be understood that when the upper feeding roll is moved upwardly to separate it from the lower feeding roll, the upper knife 66 is likewise moved slightly upwardly, but otherwise, the knife 66 has no movement other than the bodily movement brought about by the engaging pressure of the swinging knife 67.

The knife 67 is mounted upon the plates 73 which are pivoted on the bar 69, and slotted at 74 to accommodate the spindles 36 and 37 of the feeding rolls and thereby permit the necessary upward swinging movement of the knife. The upper knife 66 is provided at one end with a cam 75, see Figs. 6 and 7, and the swinging knife 67 has a cutting edge that is inclined from one end to the other, its upper end being guided into cutting relation with the upper knife by means of the cam 75, after which the edge of the lower knife progressively engages the edge of the upper knife, pressing the latter slightly rearwardly against the action of the springs 71 and thus effecting the desired shearing cut. The lower knife 67 when in its lower position rests against a stop 77, see Fig. 9, which engages one of the plates 73 when the latter is in its lowermost position, and the knife 67 is automatically swung upwardly during the idle cycle of the feeding rolls by mechanism that will now be described.

To effect this movement of the swinging knife, the plates 73 are provided with toothed segmental portions 78 which are engaged by gear segments 79 fixed on a rock shaft 81 that is actuated back and forth in timed relation to the feeding rolls, and for this purpose carires fixed thereon an arm 82, see Figs. 6 and 7, the latter being provided with an anti-friction roller 83 which is engaged and operated by a cam 84 that is fixed upon the aforementioned shaft 55, which carries the crank 54 and operates the feeding rolls.

It is necessary that the shaft 55, which operates both the swinging knife and the feeding rolls, be normally connected to the drive mechanism, but readily disconnected by suitable control means, since the operator must disconnect this shaft to stop movement of the swinging knife and feeding rolls each time a sheet is inserted into the machine, and this is accomplished in the following manner.

Figure 10:
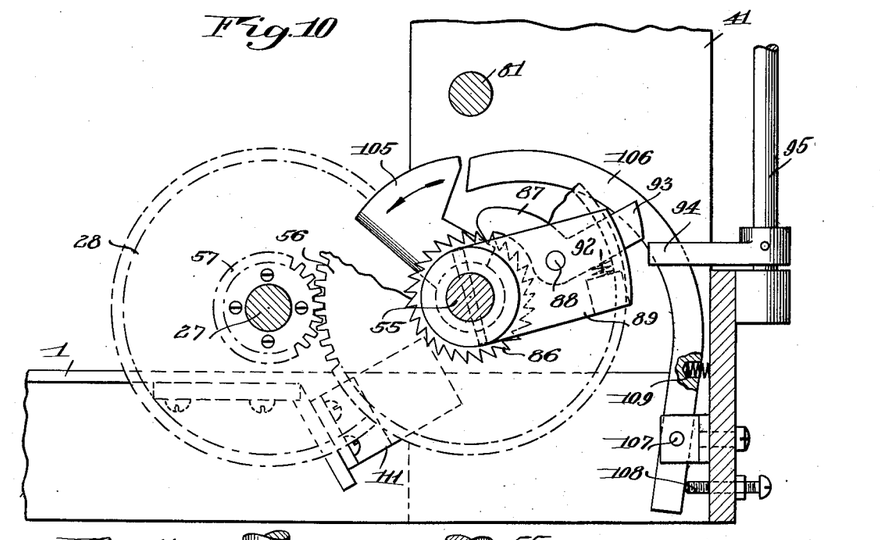
Fig. 10 is an enlarged sectional view on the line 10—10 of Fig. 3, showing the operating parts for the cutoff mechanism.

Referring to Figs. 9, 10 and 11, the gear 56 which is driven by pinion 57, is loose on the shaft 55, and carries a driving member or ratchet wheel 86 fixed thereto, and adapted to be engaged by a movable interlocking device or detent 87 that is pivoted at 88 upon a bracket 89 forming part of a sleeve 91 which is fixed on the shaft 55. The detent 87 is normally engaged with the driving member or ratchet wheel 86, as shown in Fig. 10, by means of a spring 92, see Fig. 9, carried by the bracket 89 and engaging the tail piece 93 of the pivoted detent. When the detent is free, as shown in Figs. 10 and 11, the gear 56 through the ratchet 86 and detent 87 carries the shaft 55 which is thereby rotated to operate the swinging knife and feeding rolls, as already described.

In order to stop movement of these parts when inserting a sheet of paper into the machine, control means is provided for withdrawing the detent 87, as shown in Fig. 9. This is preferably accomplished by releasing means in the form of an arm 94 fixed on a vertical rock shaft 95 and movable from the position shown in full lines in Fig. 10 to the position shown in dotted lines in order to disengage the parts referred to. It will be understood that when the arm 94 is in the position shown in full lines in Fig. 10, the bracket 89 is free to rotate and with it the shaft 55, and when the arm 94 is moved to the position shown in dotted lines in Fig. 10, and as shown in Fig. 9, it is in the path of the tail piece 93 of the detent which is engaged and withdrawn from engagement with the ratchet wheel 86, permitting the shaft 55 to remain stationary.

Figure 2:
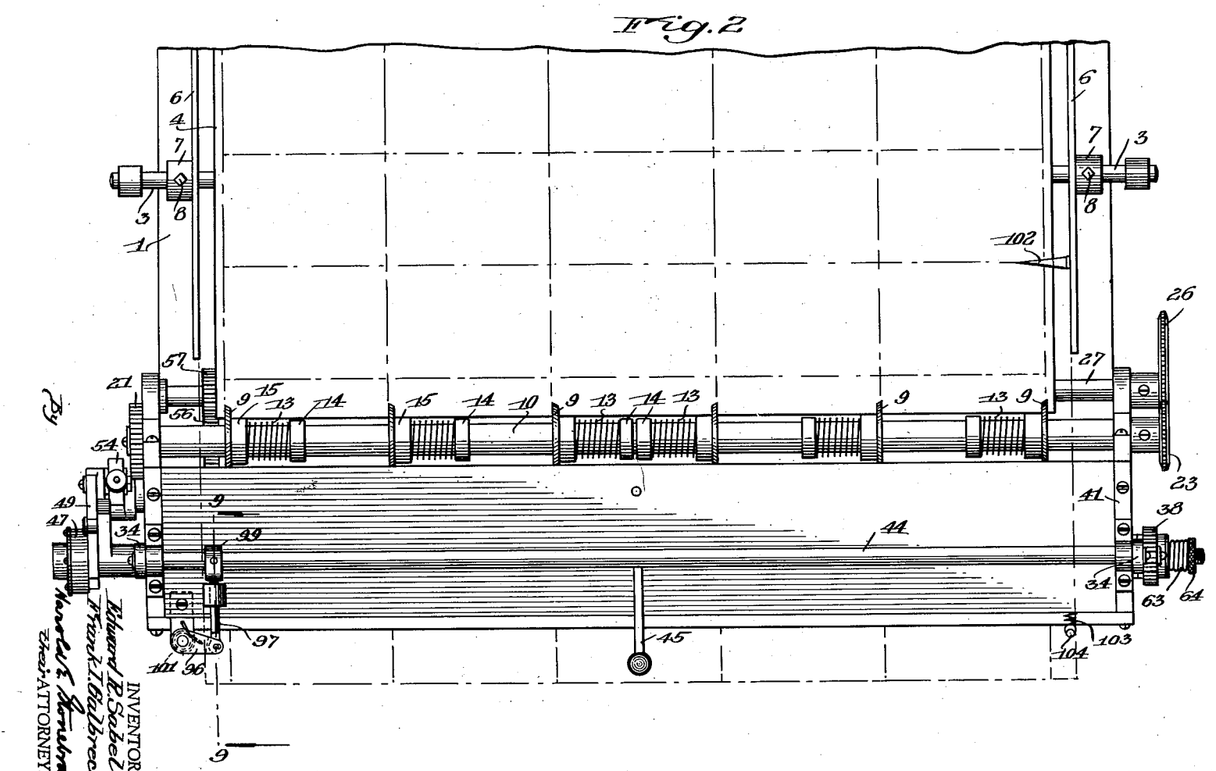
Fig. 2 is a plan view of the same, partially broken away.
Figure 8:
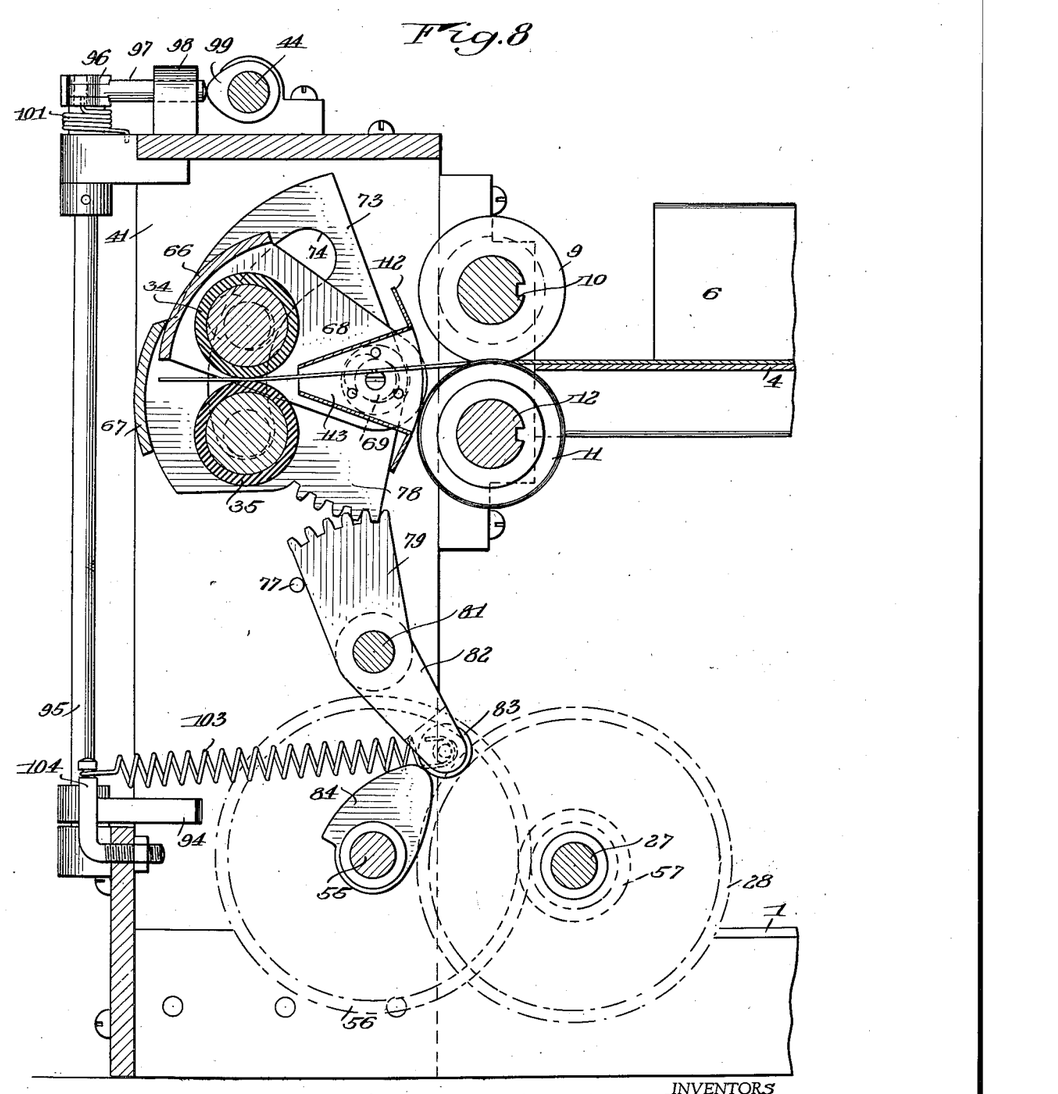
Fig. 8 is a similar view showing the position of the cutoff mechanism and operating parts when the swinging knife has about completed its cutting stroke.

The rock shaft 95 carries at its upper end the bifurcated arm 96, see Figs. 2 and 9, to which is pivotally connected a plunger 97 movable horizontally in a bracket 98 and arranged to be engaged and operated by the cam 99, see Fig. 8, that is fixedly carried on the aforementioned rock shaft 44, see Fig. 6. 101 is a coil spring having one end connected to the frame of the machine and its other end connected to the arm 96, see Fig. 2, and acting to move the vertical rock shaft 95, when released, to the position shown in Fig. 9 in which the detent 87 is disengaged and the shaft 55 is stationary. At the same time, the upper feeding roll is lifted away from the lower feeding roll in the manner already described by the rock shaft 44.

With the parts in this position, a work sheet can be inserted into the machine and moved past the slitting rolls, being accurately positioned with reference to a gauge 102, see Fig. 2. Thereupon the operator swings the handle 45 of the control means from the position shown in Figs. 5 and 7 and the full line position of Fig. 1 to the dotted line position of Fig. 1, moving the vertical rock shaft 95 positively which thereupon swings the releasing member or arm 94 to the position shown in Fig. 11, whereupon the shaft 55 is driven by the detent 87, ratchet wheel 86, and the parts already described. The cycle of operation of the feeding rolls and cutoff mechanism continues as long as the rock shaft 44 remains in the position just described, and when the operator desires to insert a fresh sheet in the machine, the control handle 45 and shaft 44 are thrown over to the position illustrated in Fig. 1 in dotted lines, and in Fig. 9.

Referring to Figs. 7 and 8, 103 designates a spring connected at one end to a post 104 and at its opposite end to the outer end of the arm 82, and acting to move said arm and likewise the swinging knife back to initial position when released by the cam 84.

In order to prevent any return movement of the shaft 55 and the cam 84 at the moment when shaft 55 is disconnected by arm 94, as shown in full lines in Fig. 9 and in dotted lines in Fig. 11, there is mounted fixedly on the shaft 55 an arm 105, see Fig. 10, which during turning of the shaft 55 rides against a shoe 106 that is pivotally supported at 107, and is held in the position shown against a stop 108 by the spring 109. As the arm 105 travels around with the shaft 55, it engages the shoe 106 and pushes it out of the way against the action of spring 109 until it clears the free end of the shoe, as shown in Fig. 10, at which point the shoe drops behind the arm 105 and prevents any return movement thereof or of the shaft 55 at the instant when the detent 87 is disengaged to release the shaft 55 from movement. It is also desirable to insure a uniform, smooth movement of the crank shaft 55, and this is accomplished by providing brake shoes 111, see Figs. 4 and 10, which engage on opposite surfaces of the arm 105 and offer sufficient resistance to the movement thereof to prevent chattering or irregular movement of the shaft 55 that might otherwise result from its crank connection to the feeding rolls.

Figures 14, 15:
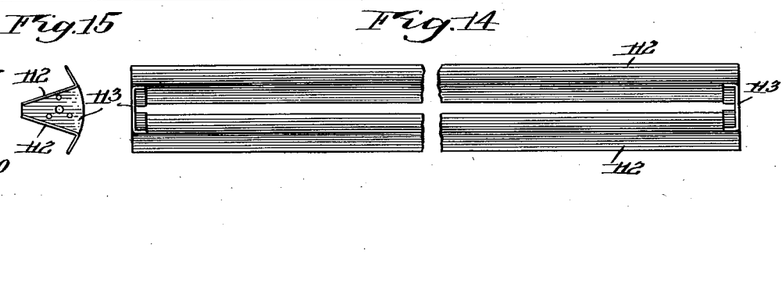
Fig. 14 is a view in rear elevation, broken away centrally, of the guide chute located between the slitting knives and the feeding rolls.
Fig. 15 is a transverse vertical sectional view of the same.
Figure 16:
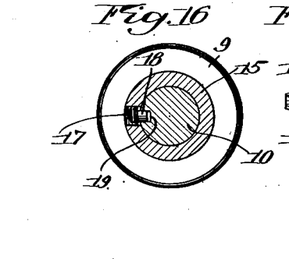
Fig. 16 is a detail sectional view on line 16—16 of Fig. 4, showing one of the yieldable slitting knives and its mounting.
Figure 17:
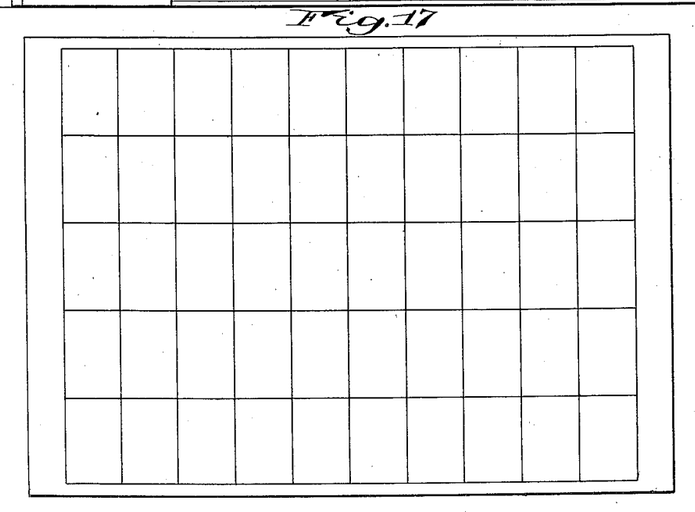
Fig. 17 is a view in elevation illustrative of one of the paper sheets to be cut.
Figure 18:
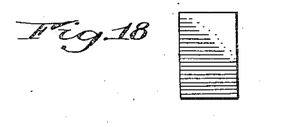
Fig. 18 is a view in elevation of one of the separate pieces into which the sheet is cut.

As a sheet of paper such as shown in Fig. 17 is introduced into the machine and is cut endwise by the slitting rolls, it is necessary to guide the narrow slitted portions between the feeding rolls, and this is accomplished by a guide chute having opposite converging walls 112, see Fig. 7, and end walls 113, see Fig. 14, by which the guide chute is supported. The guide chute has its narrow outlet located just behind the feeding rolls and this insures proper entering of the narrow strips between the feeding rolls as the sheet is being positioned in the machine. It will be understood that it requires only a few seconds to cut each sheet into the sized pieces illustrated in Fig. 18, after which the operator disengages the cutoff mechanism and the feeding rolls, at the same time separating the feeding rolls, in the manner already described, and positions a fresh sheet in the machine. When the sheet is accurately lined up by locating a predetermined point on the sheet with the gauge on the feed table, the operator again manipulates the control lever to engage the feeding rolls and cutoff mechanism, and the operation is repeated.

While the invention has been described with reference to the specific embodiment herein shown, it is not limited to any particular construction, and this application is intended to cover any modifications or changes that may come within the purposes of the improvements or the scope of the following claims.

We claim:

1. The combination with a series of interengaging rotating slitting knives which are adjustably mounted to enable slitting a sheet of material endwise into strips of various widths, of feeding rolls operating intermittently to move said slit portions forwardly a predetermined distance, means for varying the extent of feeding movement of said rolls, cutoff mechanism operating automatically while the feeding rolls are idle to cut said slit portions transversely, and control means operable to disengage said cutoff mechanism and feeding rolls and to separate said feeding rolls simultaneously.

2. The combination with a series of interengaging rotating knives operating to slit a sheet of material endwise, of feeding rolls engageable with said slit portions and acting intermittently to move them forwardly a predetermined distance, retarding mechanism connected to said feeding rolls and operating to prevent their movement during the idle cycle and thereby to hold the sheet of material against movement in either direction when the feeding rolls are idle, and cutoff mechanism operating automatically to cut said slit portions transversely while the feeding rolls are idle.

3. The combination with a series of interengaging rotating knives for slitting a sheet of material endwise, of feeding rolls engageable with said slit portions and acting intermittently to move them forwardly a predetermined distance, retarding mechanism connected to said feeding rolls and operating to prevent their movement during the idle cycle, cutoff mechanism operating automatically to cut said slit portions transversely while the feeding rolls are idle, said cutoff mechanism including a swinging knife and operating means therefor comprising a shaft and cam thereon operatively associated with said swinging knife, a crank on said shaft operatively connected to said feeding rolls, and means acting to retard the movement of said shaft.

4. The combination with a series of interengaging rotating knives for slitting a sheet of material endwise, of intermittently operating feeding rolls located in advance of said slitting knives, cutoff mechanism operating automatically to sever said slit portions transversely after they have been moved forwardly a predetermined distance, and a guide chute including top and bottom converging walls located between the rotating knives and the feeding rolls and acting to direct the slit portions between the feeding rolls after they leave the rotating knives.

5. The combination with a series of interengaging rotating knives operating to slit a sheet of material endwise, of feeding rolls engaging said slit portions and movable intermittently to feed them a predetermined distance, cutoff mechanism operating automatically while the feeding rolls are idle to cut said slit portions transversely, and control means operable to disengage said cutoff mechanism and feeding rolls and simultaneously to separate said feeding rolls.

6. The combination with a series of interengaging rotating knives operating to slit a sheet of material endwise, of feeding rolls engaging said slit portions and movable intermittently to feed them a predetermined distance, cutoff mechanism located beyond the feeding rolls, drive means for operating the feeding rolls and the cutoff mechanism in timed relation, and control means operable to disengage said cutoff mechanism and feeding rolls and simultaneously to separate said feeding rolls.

7. The combination with a series of interengaging rotating knives operating to slit a sheet of material endwise, of feeding rolls engageable with said slit portions and acting intermittently to move them forwardly a predetermined distance, retarding mechanism connected to said feeding rolls and operating to prevent their movement during the idle cycle, drive means for operating the feeding rolls and the cutoff mechanism in timed relation, and control means operable to disengage said cutoff mechanism and feeding rolls and simultaneously to separate said feeding rolls.

8. The combination with a series of interengaging rotating knives for slitting a sheet of material endwise, of feeding rolls engageable with said slit portions and acting intermittently to move them forwardly a predetermined distance, cutoff mechanism operating automatically to cut said slit portions transversely while the feeding rolls are idle, said cutoff mechanism including a swinging knife, and operating means for the knife and feeding rolls comprising a shaft, a cam thereon operatively associated with said swinging knife, a crank thereon operatively connected to the feeding rolls, a driving member for said shaft, a movable interlocking device carried by said shaft and locking it to the driving member, and releasing means movable into the path of said interlocking device and acting to disengage it from said driving member.

9. The combination with a series of interengaging rotating knives for slitting a sheet of material endwise, of feeding rolls engageable with said slit portions and acting intermittently to move them forwardly a predetermined distance, cutoff mechanism operating automatically to cut said slit portions transversely while the feeding rolls are idle, said cutoff mechanism including a swinging knife, and operating means for the knife and feeding rolls comprising a shaft, a cam thereon operatively associated with said swinging knife, a crank thereon operatively connected to the feeding rolls, a driving member for said shaft, a movable interlocking device carried by said shaft and locking it to the driving member, releasing means movable into the path of said interlocking device and acting to disengage it from said driving member, devices for separating said feeding rolls, and control means connected to said last mentioned devices and to said releasing means and acting to separate said feeding rolls and to operate said releasing means simultaneously.

10. The combination with a series of interengaging rotating knives for slitting a sheet of material endwise, of feeding rolls engageable with said slit portions and acting intermittently to move them forwardly a predetermined distance, cutoff mechanism operating automatically to cut said slit portions transversely while the feeding rolls are idle, said cutoff mechanism including a swinging knife, and operating means for the knife and feeding rolls comprising a shaft, a cam thereon operatively associated with said swinging knife, a crank thereon operatively connected to said feeding rolls, a driving member for said shaft, a movable interlocking device carried by said shaft and locking it to the driving member, releasing means movable into the path of said interlocking device and acting to disengage it from said driving member, and means cooperating with said shaft and acting to prevent return movement thereof when the shaft is disconnected from the driving member.

11. The combination with a series of interengaging rotating knives for slitting a sheet of material endwise, of feeding rolls engageable with said slit portions and acting intermittently to move them forwardly a predetermined distance, retarding mechanism connected to said feeding rolls and operating to prevent their movement during the idle cycle, cutoff mechanism operating automatically to cut said slit portions transversely while the feeding rolls are idle, said cutoff mechanism including a swinging knife, a pivoted lever operatively connected to said knife, a cam controlling said lever, a shaft carrying said cam, a crank on said shaft operatively connected to the feeding rolls, an interlocking detent carried by said shaft, a driving member comprising a ratchet wheel with which said detent is engageable, a releasing device movable into the path of said detent to disengage it from said driving member, and means controlling said releasing device and acting to separate the feeding rolls when the releasing device is moved into the path of said detent.

12. The combination with a series of interengaging rotating knives for slitting a sheet of material endwise, of feeding rolls engageable with said slit portions and acting intermittently to move them forwardly a predetermined distance, retarding mechanism connected to said feeding rolls and operating to prevent their movement during the idle cycle, cutoff mechanism operating automatically to cut said slit portions transversely while the feeding rolls are idle, said cutoff mechanism including a swinging knife, a pivoted lever operatively connected to said knife, a cam controlling said lever, a shaft carrying said cam, a crank on said shaft operatively connected to the feeding rolls, an interlocking detent carried by said shaft, a driving member including a ratchet wheel with which said detent is engageable, a releasing device movable into the path of said detent to disengage it from said driving member, a rock shaft eccentrically connected to one of said feeding rolls for separating them, a cam on said rock shaft, and operating means for said releasing device including a plunger in the path of said cam.

EDWARD R. SABEL.
FRANK I. GALBRECHT.